(12) United States Patent
McGrady

(10) Patent No.: US 10,195,984 B1
(45) Date of Patent: Feb. 5, 2019

(54) EMERGENCY SIGNAL SYSTEM

(71) Applicant: Bernadine McGrady, Dolton, IL (US)

(72) Inventor: Bernadine McGrady, Dolton, IL (US)

(*) Notice: Subject to any disclaimer, the term of this patent is extended or adjusted under 35 U.S.C. 154(b) by 0 days.

(21) Appl. No.: 15/361,242

(22) Filed: Nov. 25, 2016

Related U.S. Application Data

(60) Provisional application No. 62/259,929, filed on Nov. 25, 2015.

(51) Int. Cl.
*B60Q 7/00* (2006.01)
*B60Q 1/52* (2006.01)

(52) U.S. Cl.
CPC .................................. *B60Q 1/52* (2013.01)

(58) Field of Classification Search
CPC ........ B60Q 1/2611; B60Q 1/503; B60Q 1/52; B60Q 7/00; B60Q 1/2696; B60Q 1/2615; G09F 21/04; G08G 1/09675
See application file for complete search history.

(56) References Cited

U.S. PATENT DOCUMENTS

| | | | |
|---|---|---|---|
| 2,987,702 A | 6/1961 | Yohe | |
| 3,789,358 A * | 1/1974 | Ellis | B60Q 1/2611 224/329 |
| 2002/0194756 A1* | 12/2002 | Osborne | G09F 13/00 40/124.02 |
| 2009/0199762 A1* | 8/2009 | Elam | B60Q 7/00 116/28 R |
| 2013/0241725 A1* | 9/2013 | Cancio | B60Q 7/00 340/473 |
| 2016/0167648 A1* | 6/2016 | James | B60Q 1/503 701/28 |
| 2016/0281942 A1* | 9/2016 | Hernandez, IV | F21S 9/037 |

* cited by examiner

*Primary Examiner* — Brian Zimmerman
*Assistant Examiner* — Kevin Lau
(74) *Attorney, Agent, or Firm* — RG Patent Consulting, LLC; Rachel Gilboy

(57) ABSTRACT

An emergency signal system is a magnetically based "BABY" sign (in various languages) with colorful flashing lights, and an audible lullaby "siren" designed to be placed on top of a car when an expectant mother is on her way to the hospital to give birth. In this manner, the driver of the car is able to alert other motorists that a woman in labor is on her way to the hospital, and as a result, yield the road for the car's smooth and easy passage, helping to ensure timely arrival at the hospital for delivery.

14 Claims, 4 Drawing Sheets

EMERGENCY SIGNAL SYSTEM

CROSS-REFERENCE TO RELATED APPLICATION

The present application is related to and claims priority from prior provisional application Ser. No. 62/259,929, filed Nov. 25, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of emergency signals for vehicles, and more specifically relates to a magnetically based "BABY" sign (in various languages) with colorful flashing lights, and an audible lullaby "siren" designed to be placed on top of a car when an expectant mother is on her way to the hospital to give birth. In this manner, the driver of the car is able to alert other motorists that a woman in labor is on her way to the hospital, and as a result, yield the road for the car's smooth and easy passage, helping to ensure timely arrival at the hospital for delivery.

2. Description of the Related Art

Few would dispute that the anticipated arrival of a new baby is a joyous time for any young couple. Parents-to-be attend birthing classes, read books and decorate their nurseries, all in attempts to prepare for the arrival of a new child. Many thoughtful gifts and advice are received from friends and family members, who throw baby showers honoring the blessed event. As the time for the birth gets closer, Moms-to-be have their suitcases packed and ready to go as soon as contractions begin. While most have plenty of time to get to the hospital, many women find their contractions are happening very close together, and there is little time that can be wasted in making it to the hospital.

However, it is all too common to see news headlines proclaiming, "Interstate traffic jam causes woman to give birth in car," "Traffic strands taxi; stuck mom delivers baby inside," and "Baby can't wait; traffic snarl yields birth." Although these babies are safely born and spirited to the hospital as soon as possible, as can be imagined, the traumatic experience of giving birth is rendered even more terrifying for the mother when she is stuck in the middle of traffic, and not safely ensconced in a hospital delivery room, surrounded by medical professionals.

Various attempts have been made to solve the above-mentioned problems such as those found in U.S. Pat. No. 2,987,702 to Lester N. Yohe; U.S. Publication No. 2013/0241725 to Ruben Cancio; and U.S. Publication No. 2009/0199762 to Jacqueline Elam. This art is representative of emergency signals for vehicles. None of the above inventions and patents, taken either singly or in combination, is seen to describe the invention as claimed.

Ideally, an emergency signal for vehicles should provide a means to attach the signal to the roof of a vehicle to alert other motorists, have an audible and visual alert signaling means and, yet would operate reliably and be manufactured at a modest expense. Thus, a need exists for a reliable emergency signal system to avoid the above-mentioned problems.

BRIEF SUMMARY OF THE INVENTION

In view of the foregoing disadvantages inherent in the known emergency signals for vehicles art, the present invention provides a novel emergency signal system. The general purpose of the present invention, which will be described subsequently in greater detail is to provide a magnetically based "BABY" sign (in various languages) with colorful flashing lights, and an audible lullaby "siren" designed to be placed on top of a car when an expectant mother is on her way to the hospital to give birth. In this manner, the driver of the car is able to alert other motorists that a woman in labor is on her way to the hospital, and as a result, yield the road for the car's smooth and easy passage, helping to ensure timely arrival at the hospital for delivery.

An improved emergency signal for vehicles is disclosed herein comprising a main casing member formed having a rectangular shape including a base portion with attachment member attached to a bottom surface and formed as at least one magnetic member, which is adapted to connect with a roof portion of a vehicle. The main casing member is formed from a colored plastic material, with the color being chosen from a group of colors consisting of red, blue, and amber.

A siren member is attached to the main casing member and adapted to emit an audible sound when the light members are activated. It further has at least one side wall attached to and extending from the base portion, and formed from a translucent material. The base portion, at least one side wall, and top portion form a hollow interior portion. Indicia, such as the word "BABY", is able to be placed upon an outer surface of at least one side wall, which is adapted to indicate the existence of a pregnant woman in labor within the vehicle the improved emergency signal is attached to.

It further includes at least one light member located within the hollow interior portion and attached to the base portion, with the at least one light member adapted to rotate with respect to the base portion. A power source is adapted to power the two light members and indicia with light emitting diodes located within the hollow interior portion, which are attached to the base portion, spaced from one another, and rotate with respect to the base portion.

The power source includes a 12 volt plug adapted to connect with a cigarette lighter of the vehicle. The light members are adapted to emit a color chosen from a list of colors consisting of red, blue, amber, pink, and green. The audible sound of the siren member resembles the music of a chosen lullaby tune. The improved emergency signal further comprises Bluetooth® technology located within the hollow interior portion of the main casing member.

The present invention holds significant improvements and serves as an emergency signal system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, emergency signal system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an emergency signal for a vehicle and more particularly to an emergency signal system as used to improve the ability of an expectant couple to display an audible and visual alert to surrounding motorists that an emergency is in progress, and thus, help clear the roadway for the drive to the hospital.

Generally speaking, an emergency signal system is a rectangular shaped unit with a magnetic base, and a durable plastic casing. Each end would feature a rotating set of light emitting diodes (LEDs), similar in style to police-type lights but in different colors, such as one red light and one blue light, as to not be confused with law enforcement lights. Wiring connections are soldered inside the light lens/cover for a waterproof connection. Centrally positioned and prominently displayed on the casing would be the illuminated word "BABY" in large letters, and in various languages to help identify the emergency.

The emergency signal system would be configured to emit a loud sound to augment the lights, which is mounted inside one of the two rotating light housings. This could take the form of a lullaby tune, in keeping with the theme of the product. As this product would operate via a 12 Volt plug that fits directly into the vehicle's cigarette lighter bay, one need only place the emergency signal system on top of the car (magnetic bottom will secure the unit to the vehicle roof), plug in the unit, and drive quickly but carefully to the hospital. Bluetooth® technology could also be incorporated into this product. With such a visible and audible warning, other cars should instantly understand the nature of the emergency, and clear the way.

Figure 1:
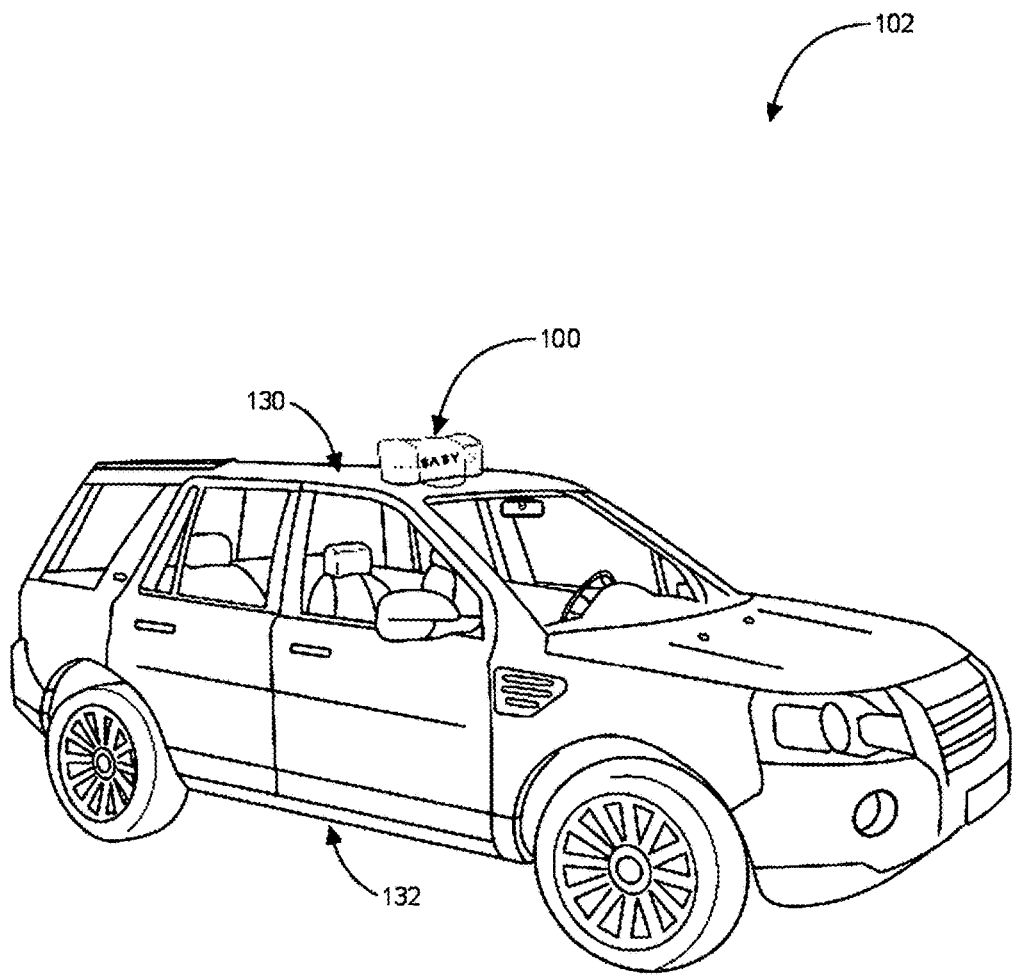
FIG. 1 shows a perspective view illustrating an emergency signal system in an in-use condition according to an embodiment of the present invention.

Referring to the drawings by numerals of reference there is shown in FIG. 1, a perspective view illustrating an emergency signal system 100 in an in-use condition 102 according to an embodiment of the present invention.

Improved emergency signal 100 for vehicles is disclosed herein comprising main casing member 106 formed having rectangular shape 108 including base portion 112 with attachment member 114 attached to bottom surface 116 and formed as at least one magnetic member 118, which is adapted to connect with roof portion 130 of vehicle 132. Main casing member 106 is formed from colored plastic material 110, with the color being chosen from a group of colors consisting of red, blue, and amber.

Figure 2:
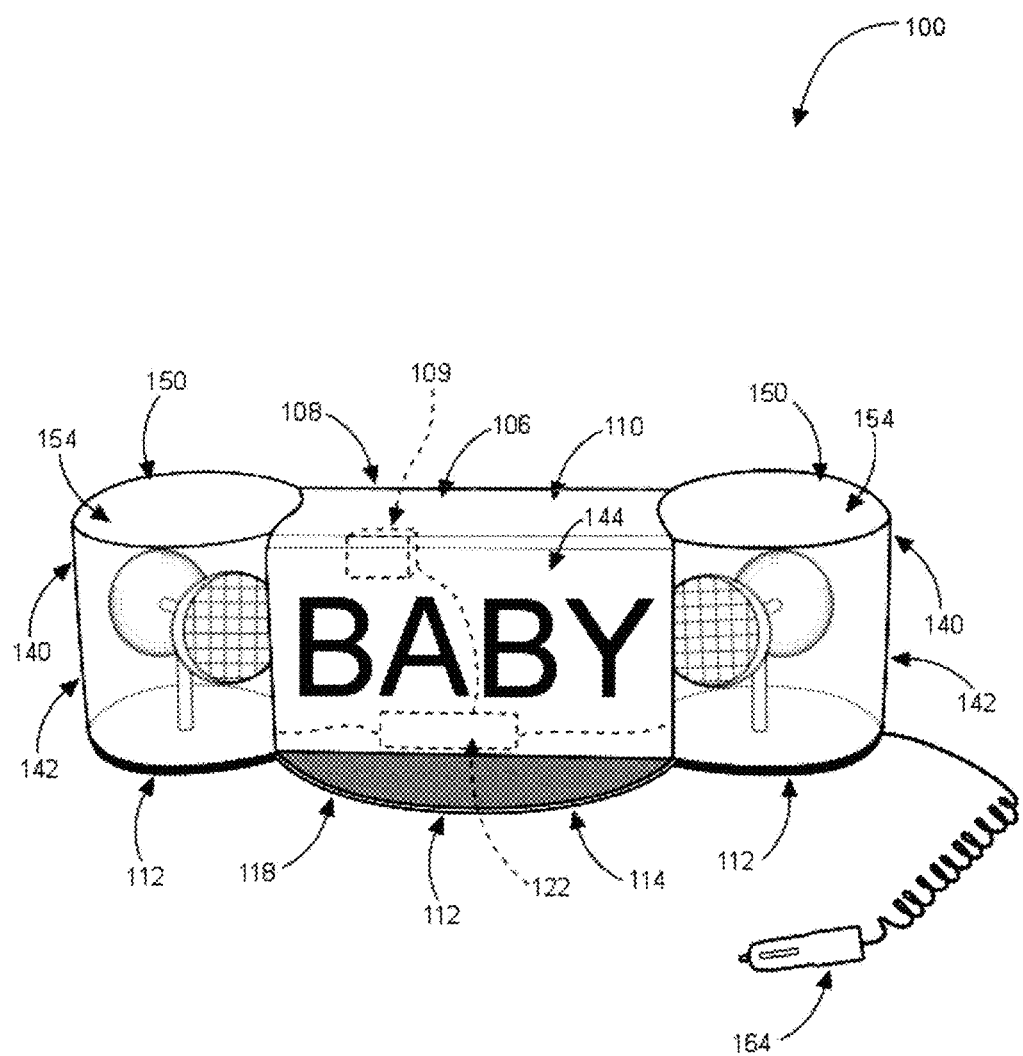
FIG. 2 is a front view illustrating an emergency signal system according to an embodiment of the present invention of FIG. 1.

Referring now to FIG. 2, a front view illustrating an emergency signal system 100 according to an embodiment of the present invention.

Siren member 109 is attached to main casing member 106 and adapted to emit an audible sound when light members 120 are activated. It further has at least one side wall 140 attached to and extending from base portion 112, and formed from translucent material 142. Base portion 112, at least one side wall 140, and top portion 150 form hollow interior portion 154. Indicia, such as the word "BABY", is able to be placed upon outer surface 144 of at least one side wall 140, which is adapted to indicate the existence of a pregnant woman in labor within vehicle 132 the improved emergency signal 100 is attached to.

Figure 3:
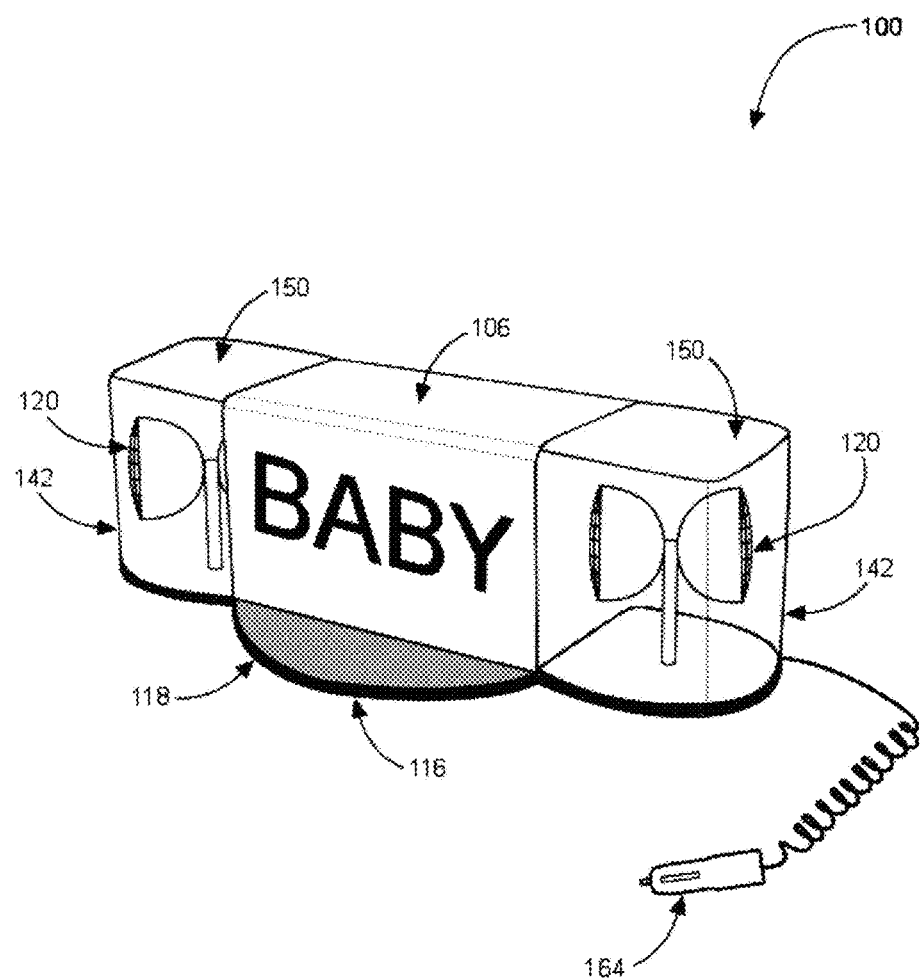
FIG. 3 is another perspective view illustrating emergency signal system according to an embodiment of the present invention of FIG. 1.

Referring now to FIG. 3, another perspective view illustrating an emergency signal system 100 according to an embodiment of the present invention.

Emergency signal system 100 further includes at least one light member 120 located within hollow interior portion 154 and attached to base portion 112. At least one light member 120 comprises at least two light members 120 adapted to rotate with respect to base portion 112. Power source 122 is adapted to power two light members 120 and indicia with light emitting diodes 162 located within hollow interior portion 154, which are attached to base portion 112, spaced from one another, and rotate with respect to base portion 112.

Figure 4:
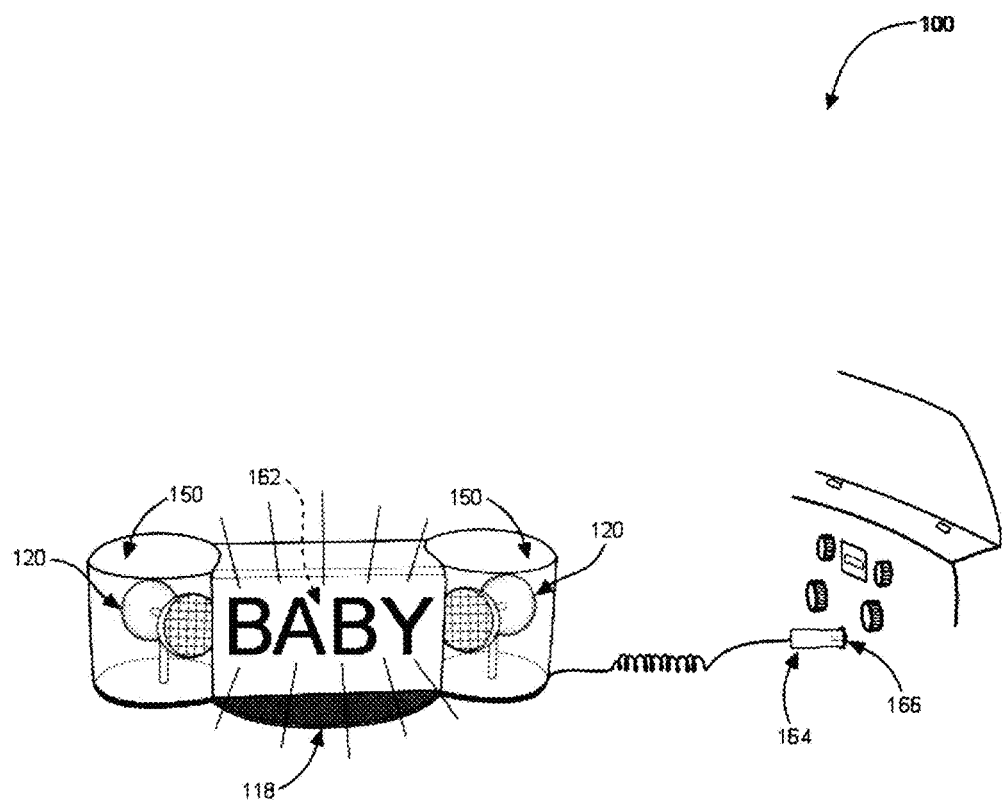
FIG. 4 is a perspective view illustrating emergency signal system as it would attach to a cigarette lighter according to an embodiment of the present invention of FIG. 1.

Referring now to FIG. 4, a perspective view illustrating an emergency signal system 100 as it would attach to a power source according to an embodiment of the present invention.

Power source 122 includes 12 volt plug 164 adapted to connect with cigarette lighter 166 of vehicle 132. Light members 120 are adapted to emit a color chosen from a list of colors consisting of red, blue, amber, pink, and green. The audible sound of siren member 109 resembles the music of a chosen lullaby tune. Improved emergency signal 100 further comprises Bluetooth® technology located within hollow interior portion 154 of main casing member 106.

Emergency signal system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed:

1. An improved emergency signal for vehicles, comprising:
    a main casing member including:
        a base portion;
            wherein said base portion includes an attachment member attached to a bottom surface thereof adapted to releasably connect with a roof portion of a vehicle;
        at least one side wall;
            wherein said at least one side wall is attached to and extends from said base portion, and is formed from a translucent material;
        a top portion
            wherein said top portion is attached to said at least one side wall;
        wherein said base portion, said at least one side wall, and said top portion form a hollow interior portion; and
        indicia placed upon an outer surface of said at least one side wall adapted to indicate the existence of a pregnant woman in labor within said vehicle the improved emergency signal is attached to;
    at least one light member;
        wherein said at least one light member is located within said hollow interior portion and attached to said base portion; and
        wherein said at least one light member is adapted to rotate with respect to said base portion;
    a power source;
        wherein said power source is adapted to power said light member;
    a siren member;
        wherein said siren member is attached to said main casing member and is adapted to emit an audible sound when said at least one light member is activated; and
        wherein said audible sound of said siren member resembles the music of a chosen lullaby tune, to thereby alert other motorists that a woman in labor is on her way to the hospital;
    wherein said improved emergency signal is adapted to releasably connect with said roof portion of said vehicle to thereby indicate the existence of a pregnant woman in labor within said vehicle the improved emergency signal is attached to.

2. The improved emergency signal of claim 1, wherein there are two light members located within said hollow interior portion, are spaced from one another, and are both attached to said base portion; and wherein both of said two light members are adapted to rotate with respect to said base portion.

3. The improved emergency signal of claim 1, wherein said main casing member is formed having a rectangular shape.

4. The improved emergency signal of claim 1, wherein said at least one light member includes light emitting diodes.

5. The improved emergency signal of claim 1, wherein said attachment member is formed as at least one magnetic member.

6. The improved emergency signal of claim 1, wherein said at least one light member is adapted to emit a color chosen from a list of colors consisting of red, blue, amber, pink, and green.

7. The improved emergency signal of claim 1, wherein said indicia is formed as the word "BABY".

8. The improved emergency signal of claim 1, further comprising an indicia light source powered by said power source and is adapted to illuminate said indicia.

9. The improved emergency signal of claim 1, wherein said power source includes a 12 volt plug adapted to releasably connect with a cigarette lighter of said vehicle.

10. The improved emergency signal of claim 1, wherein said attachment member is formed as at least one suction cup.

11. The improved emergency signal of claim 1, further comprising Bluetooth® technology located within said hollow interior portion of said main casing member.

12. The improved emergency signal of claim 1, wherein said main casing member is formed from a plastic material.

13. The improved emergency signal of claim 12, wherein said plastic material is formed having a color chosen from a group of colors consisting of red, blue, and amber.

14. The improved emergency signal of claim 1, wherein said base portion is rotatable with respect to said attachment member.

* * * * *